(12) United States Patent
Shimpi et al.

(10) Patent No.: US 9,975,071 B2
(45) Date of Patent: May 22, 2018

(54) APPARATUSES, SYSTEMS AND METHODS FOR PROVIDING FILTER RECOGNITION

(71) Applicant: CUMMINS FILTRATION IP, INC., Columbus, IN (US)

(72) Inventors: Abhijit Shimpi, Columbus, IN (US); Andry Lesmana, Columbus, IN (US); Adaeze Okoye, Indianapolis, IN (US); Joseph Okoro, Columbus, IN (US)

(73) Assignee: Cummins Filtration IP, Inc., Columbus, IN (US)

( * ) Notice: Subject to any disclaimer, the term of this patent is extended or adjusted under 35 U.S.C. 154(b) by 252 days.

(21) Appl. No.: 14/783,770

(22) PCT Filed: Apr. 7, 2014

(86) PCT No.: PCT/US2014/033190
§ 371 (c)(1),
(2) Date: Oct. 9, 2015

(87) PCT Pub. No.: WO2014/168875
PCT Pub. Date: Oct. 16, 2014

(65) Prior Publication Data
US 2016/0067639 A1    Mar. 10, 2016

Related U.S. Application Data

(60) Provisional application No. 61/810,946, filed on Apr. 11, 2013.

(51) Int. Cl.
*B01D 35/143* (2006.01)
*F02D 41/22* (2006.01)
(Continued)

(52) U.S. Cl.
CPC ......... *B01D 35/143* (2013.01); *B01D 35/005* (2013.01); *B01D 46/009* (2013.01);
(Continued)

(58) Field of Classification Search
CPC ...... B01D 29/60; B01D 29/605; B01D 35/14; B01D 35/143; B01D 35/005; B01D 35/30;
(Continued)

(56) References Cited

U.S. PATENT DOCUMENTS 5,674,381 A * 10/1997 Den Dekker ........ B01D 35/143
210/138
6,207,045 B1 * 3/2001 Jiang .................. B01D 17/0214
210/114

(Continued)

OTHER PUBLICATIONS

International Search Report and Written Opinion for PCT/US2014/033190, dated Sep. 8, 2014, 9 pages.
(Continued)

*Primary Examiner* — Joseph Drodge
(74) *Attorney, Agent, or Firm* — Foley & Lardner LLP

(57) ABSTRACT

The application generally relates to digital Engine Integrity Protection (EIP) systems for filters for internal combustion engines and methods of using the digital EIP systems. A pre-programmed digital chip is integrated in filtration hardware such that the Engine Control Unit (ECU) or another controller installed on the engine or vehicle can read encrypted digital signal from the chip when electrically connected with the filter hardware. Based on the read information from the chip, the ECU or controller can determine whether the filter associated with the chip is a genuine filter or a non-genuine filter.

23 Claims, 15 Drawing Sheets

(51) Int. Cl.
*F01M 13/04* (2006.01)
*B01D 46/00* (2006.01)
*B01D 46/42* (2006.01)
*B01D 35/00* (2006.01)

(52) U.S. Cl.
CPC ........... *B01D 46/429* (2013.01); *F01M 13/04* (2013.01); *F02D 41/22* (2013.01); *B01D 2201/52* (2013.01)

(58) Field of Classification Search
CPC .... B01D 35/308; B01D 36/00; B01D 36/003; B01D 36/005; B01D 46/009; B01D 46/429; B01D 2201/52; B01D 2201/56; F01M 2013/0438; F01M 2013/0477; F01M 13/04; F01M 2011/0029; F02D 41/22
USPC .......... 210/85, 91, 282, 143, 96.1, 295, 299, 210/303, 799; 235/375, 376, 385; 340/5.8, 10.1, 603, 604, 606, 607, 618; 96/414, 417, 423, 424; 184/108
See application file for complete search history.

(56) References Cited

U.S. PATENT DOCUMENTS

| | | | | |
|---|---|---|---|---|
| 6,246,831 | B1 | 6/2001 | Seitz et al. | |
| 6,361,684 | B1* | 3/2002 | Hawkins | B01D 35/18 210/149 |
| 6,533,926 | B2* | 3/2003 | Hawkins | B01D 29/21 210/282 |
| 6,537,444 | B2* | 3/2003 | Wilberscheid | B01D 29/21 210/236 |
| 6,551,503 | B2* | 4/2003 | Niers | B01D 35/143 210/443 |
| 6,558,444 | B1* | 5/2003 | Hunter | B01D 46/003 55/385.1 |
| 7,192,463 | B2* | 3/2007 | Shutty | F01N 13/008 174/50 |
| 7,615,151 | B2* | 11/2009 | Wieczorek | F02M 37/22 210/234 |
| 7,638,042 | B2* | 12/2009 | Astle | B01D 27/101 210/100 |
| 7,850,845 | B2* | 12/2010 | Wieczorek | F02M 37/22 210/100 |
| 7,959,714 | B2* | 6/2011 | Smith | B01D 46/0002 123/198 E |
| 8,105,483 | B2* | 1/2012 | South | B01D 35/30 210/103 |
| 8,114,182 | B2* | 2/2012 | Smith | B01D 46/0002 55/323 |
| 8,653,940 | B2* | 2/2014 | Nyffeler | G06K 19/14 235/375 |
| 9,279,780 | B2* | 3/2016 | Gwin | B01D 36/005 |
| 9,403,110 | B2* | 8/2016 | Gwin | B01D 35/143 |
| 9,535,050 | B2* | 1/2017 | Massey | G01N 27/12 |
| 2002/0144938 | A1* | 10/2002 | Hawkins | B01D 29/21 210/85 |
| 2003/0085180 | A1* | 5/2003 | Akins | B01D 17/0214 210/744 |
| 2005/0247642 | A1* | 11/2005 | Schenk | B01D 21/0024 210/744 |
| 2006/0011164 | A1* | 1/2006 | Kropinski | F02D 41/042 123/198 D |
| 2006/0192570 | A1* | 8/2006 | Dworatzek | B01D 46/0086 324/699 |
| 2007/0289915 | A1* | 12/2007 | Jiang | B01D 27/06 210/338 |
| 2008/0230146 | A1* | 9/2008 | Kastner | B64F 1/28 141/192 |
| 2009/0115581 | A1* | 5/2009 | Forster | G06K 19/0723 340/10.1 |
| 2009/0168753 | A1* | 7/2009 | Campero | G01S 13/825 370/351 |
| 2010/0106265 | A1* | 4/2010 | Ebrom | H04L 69/26 700/90 |
| 2010/0276352 | A1* | 11/2010 | Mendel | B01D 35/143 210/235 |
| 2011/0006878 | A1* | 1/2011 | Nyffeler | G06K 19/0723 340/5.8 |
| 2011/0220560 | A1* | 9/2011 | Verdegan | G06Q 10/06 210/90 |
| 2011/0259088 | A1* | 10/2011 | Fisher | G01N 33/2847 73/61.43 |
| 2011/0259802 | A1* | 10/2011 | Wieczorek | B01D 36/005 210/96.1 |
| 2011/0308396 | A1* | 12/2011 | Mori | A47J 31/46 99/275 |
| 2013/0009750 | A1* | 1/2013 | Turner | G06K 19/0723 340/10.1 |
| 2013/0021138 | A1* | 1/2013 | Ezzat | G01M 5/0033 340/10.1 |
| 2014/0202580 | A1* | 7/2014 | Hutchinson | B67D 7/342 141/1 |
| 2016/0273471 | A1* | 9/2016 | Shimpi | B01D 35/143 |

OTHER PUBLICATIONS

Maniyar, Sashavalli, "AN1199 1-Wire Communication with PIC Microcontroller," Microchip Technology Inc., Jan. 2, 2008, 16 pages.

* cited by examiner

APPARATUSES, SYSTEMS AND METHODS FOR PROVIDING FILTER RECOGNITION

CROSS REFERENCE TO RELATED APPLICATIONS

This application is a National Stage of PCT Application No. PCT/US2014/033190, filed Apr. 7, 2014, which claims the benefit of priority to U.S. Provisional Patent Application No. 61/810,946, entitled "APPARATUSES, SYSTEMS AND METHODS FOR PROVIDING FILTER RECOGNITION," filed on Apr. 11, 2013. The contents of both applications are incorporated herein by reference in their entirety and for all purposes.

FIELD

The present application relates to filters and filtration systems, including filtration systems for internal combustion engines. Specifically, the present application relates to methods and apparatuses for recognition of genuine filter use in such systems.

BACKGROUND

Internal combustion engines require clean working fluids (e.g., air, fuel, engine oil, hydraulic fluid, etc.) for efficient operations. Accordingly, filters (e.g., air filters, fuel filters, engine oil filters, hydraulic fluid filters, etc.) are utilized to provide clean working fluids to internal combustion engines. The filters have a limited lifecycle and are often replaced with replacement filters during routine servicing of the internal combustion engines. The use of sub-par replacement filters (e.g., non-OEM filters, counterfeit filters, etc.) can lead to reduced engine system performance and possibly engine failure.

In certain situations, customers request the use of sub-par replacement filters to save money. In other situations, customers request the use of genuine replacement filters during engine servicing operations, but are instead unknowingly given generic filters, non-OEM filters, or counterfeit filters. In these situations, the customers may be charged full price for genuine replacement filters without knowledge of the non-genuine replacement filters being used. Accordingly, filter manufacturers utilize various forms of Engine Integrity Protection (EIP) to prevent the use of non-genuine replacement filters. For example, U.S. Pat. Nos. 8,114,182, 8,105,483, 7,959,714, 7,850,845, 7,615,151, 7,192,463, 6,537,444, and 6,533,926 and U.S. Patent Application Publication No. 2011/0308396 disclose various mechanical EIP systems (e.g., systems that require uniquely mating mechanical parts to function properly) and analog EIP systems (e.g., resistor based systems that determine filter genuineness based on detected voltage changes). Each of the above recited patent and patent application documents are incorporated herein by reference in their entireties. An exemplary analog EIP method is shown in FIG. 7.

However, the current mechanical and analog EIP systems may require expensive tooling, may take up excessive packaging space, and/or may be easily counterfeited. Accordingly, there is a need for digital EIP systems to prevent installation of sub-performing and counterfeit filters during servicing operations of internal combustion engines.

SUMMARY

This Summary is provided to introduce a selection of concepts that are further described herein below in the detailed description. This summary is not intended to identify key or essential features of the claimed subject matter, nor is it intended to be used as an aid in limiting the scope of the claimed subject matter.

In the present disclosure, apparatuses, systems and methods are for providing filter recognition. A filter element is constructed to filter a fluid. A pre-programmed digital Integrated Circuit (IC) is coupled to the filter element (e.g. attached to the filter element or a housing for the filter element) and contains an encrypted digital signal that identifies the filter element (e.g. identifies the filter element and/or housing as a recognized/authorized component). A control circuit reads the digital signal from the micro-chip and compares the digital signal to a stored signal to determine whether the filter element is a recognized filter element.

In some examples, an electronic system provides unique identification of a genuine filter system assembly to a control circuit, such as the engine control unit (ECU). An electronic memory component (for example, a 1-WIRE® chip, EEPROM, EPROM etc.) is an integrated part of the existing filtration system hardware such that when connected through a wired or wireless connection, the ECU reads digital encrypted information from the chip and identifies the filter as a genuine filter. The digital chip can be integrated in any part of the filter system such that it could be used to recognize a self-contained filter or the cartridge. The digital chip connection can be made via male/female pins, conducting wires, plates, conductive plastic material or any other means.

DETAILED DESCRIPTION OF THE FIGURES

In the present description, certain terms have been used for brevity, clearness and understanding. No unnecessary limitations are to be inferred therefrom beyond the requirement of the prior art because such terms are used for descriptive purposes only and are intended to be broadly construed. The different methods, apparatus, filters, assemblies and systems described herein may be used alone The figures generally relate to digital Engine Integrity Protection (EIP) systems for filters for internal combustion engines and methods of using the digital EIP systems. A pre-programmed digital chip (e.g., a 1-WIRE® chip) is integrated in filtration hardware such that the Engine Control Unit (ECU) or another controller installed on the engine or vehicle can read encrypted digital signal from the chip when electrically connected with the filter hardware. Based on the read information from the chip, the ECU or controller can determine whether the filter associated with the chip is a genuine filter or a non-genuine filter.

Figure 1:
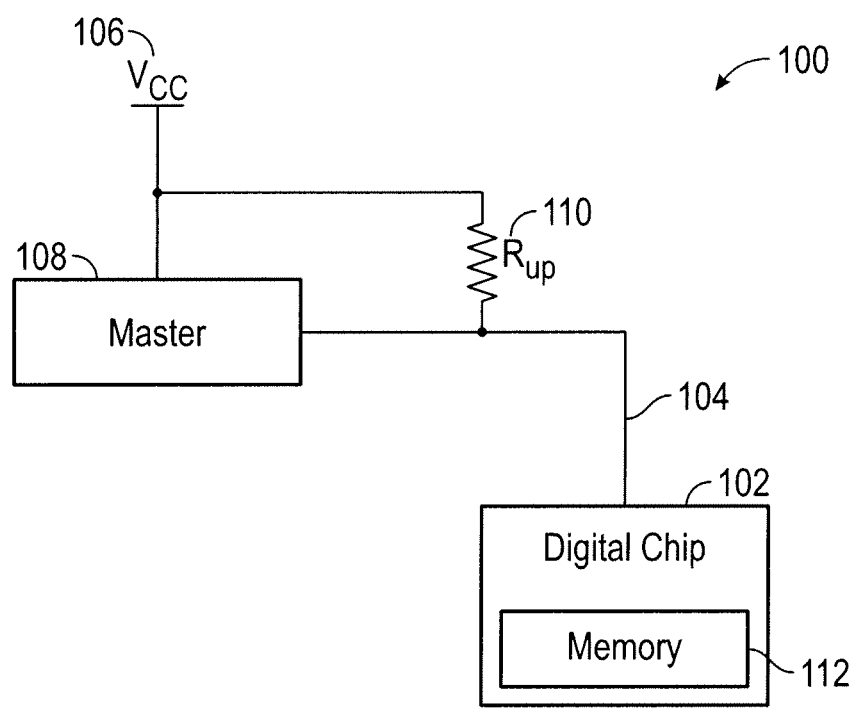
FIG. 1 shows a schematic diagram of a digital chip bus system according to an exemplary embodiment.

Referring to FIG. 1, a schematic diagram of a digital microchip or chip (e.g., a 1-WIRE® chip) bus system 100 is shown according to an exemplary embodiment. The system includes a digital microchip 102, referred to herein as a digital chip. The digital chip 102 is used as a recognition device for a component of a filter system of an internal combustion engine. The digital chip 102 can be integrated on an integrated circuit, which then is installed permanently on the filter system. The digital chip bus system 100 utilizes a serial communication protocol with a single data line 104 and ground reference 106 to establish electronic communication between the digital chip 102 and a master controller 108 (e.g., a 1-WIRE® Master). The master controller 108 is in communication with a controller of the internal combustion engine (e.g., the ECU or another controller) via a wired or wireless data link. The master controller 108 initiates and controls the communication with one or more digital chips 102 on the single data line 104. A pull-up resistor 110 is positioned on the single data line 104. The digital chip 102 includes a memory module 112. The memory module 112 may include volatile or non-volatile memory. The memory may be read-only memory or rewritable memory. Information about the component of the filter system may be stored on the memory. The information may include a filter part number, a serial code, date of manufacture, location of manufacture, and other identifying information.

The digital chip 102 is used to identify the component of the filter system. Generally, a method of using the digital chip 102 to identify the component includes loading the memory module 112 of the digital chip 102 with unique digital code, embedding the digital chip 102 into a component of the filter system, using a control circuit (e.g., the master controller 108) to read the unique code stored in the chip, verifying the code against a reference database or mathematical function, and issuing feedback upon completing verification to a controller (e.g., the ECU or another controller) of the internal combustion engine.

The unique digital code may be a unique filter code corresponding to a filter. The unique filter code can be loaded into the memory module 112 through a wired or wireless digital signal connection with a programming device. The digital chip 102 can be integrated permanently to the serviceable filter component of the filter assembly. For example, the chip could be integrated into the shell for a spin-on filter or into the element for a cartridge/module-style filter. The unique digital code stored in the memory module 112 of the digital chip 102 is read by a control circuit (e.g., the master controller 108, the ECU, another controller, etc.). In some arrangements, the reading of the unique code stored in the digital chip 102 may be accomplished through a wired or wireless communication link to a control circuit tied to a neighboring sub-system. The unique code may be read by the control circuit by sending a request via the communication link at present time intervals (e.g., every 10 minutes of engine run time), at every key on event, or as a result of a certain condition (e.g., after a filter service is performed). The control circuit can comprise one or more control modules or sections, each having a memory and a processor for sending and receiving control signals and for communicating with peripheral devices, including additional control circuits, sensors, input devices, and output devices. The control circuit may perform the code verification process by executing a series of internal logic processes and referencing a lookup table or mathematical function as baseline. Upon completing verification process, control circuit may issue output to an operator or a technician via a user interface of the internal combustion engine in the forms of text messages displayed on a display screen, generating fault code, activating warning light, or by any other suitable means.

Figure 2:
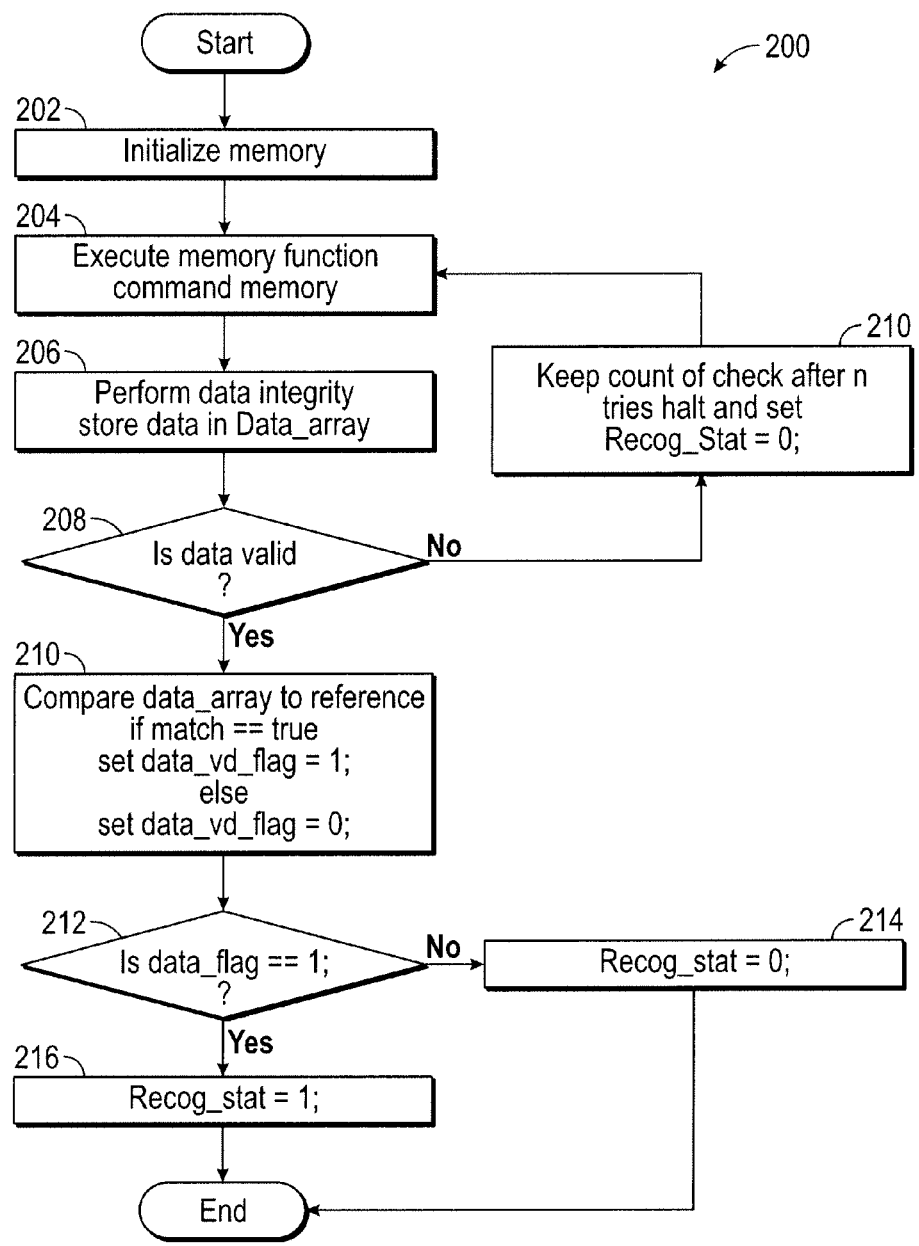
FIG. 2 shows a method of reading a digital chip of a digital Engine Integrity Protection (EIP) system and performing a digital recognition of a component of a filter system based on the digital chip according to an exemplary embodiment.
Figure 3A:
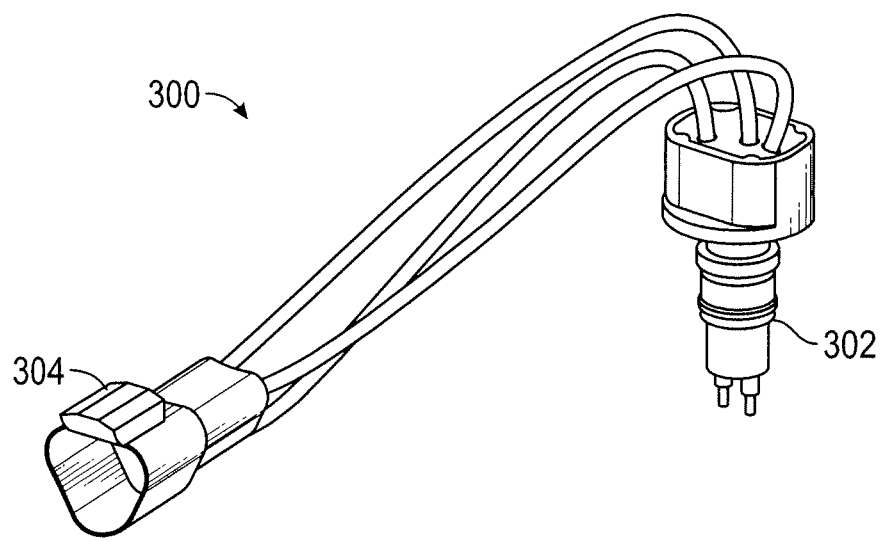
FIGS. 3A through 3D show a water-in-fuel (WIF) sensor system according to an exemplary embodiment.
Figure 3B:
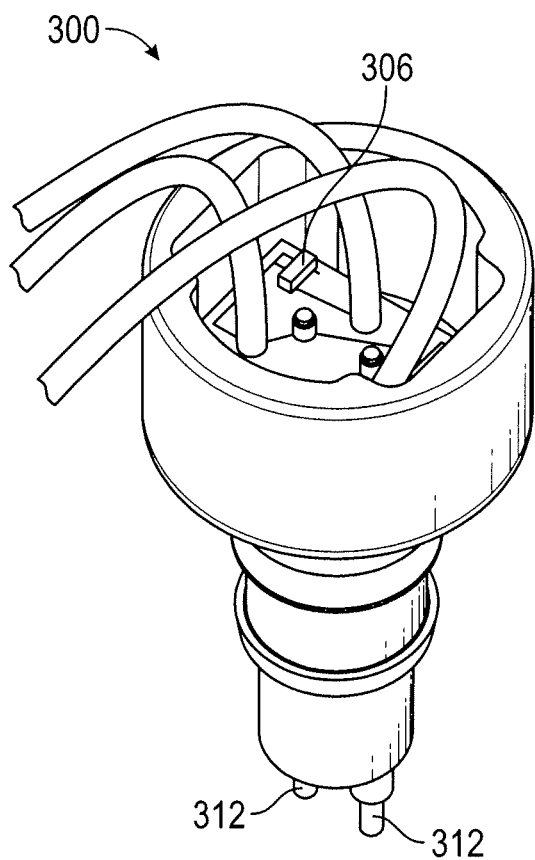
Figure 3C:
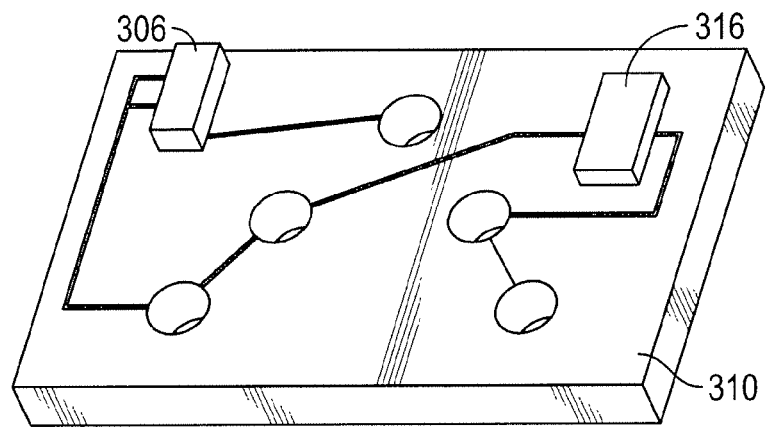
Figure 3D:
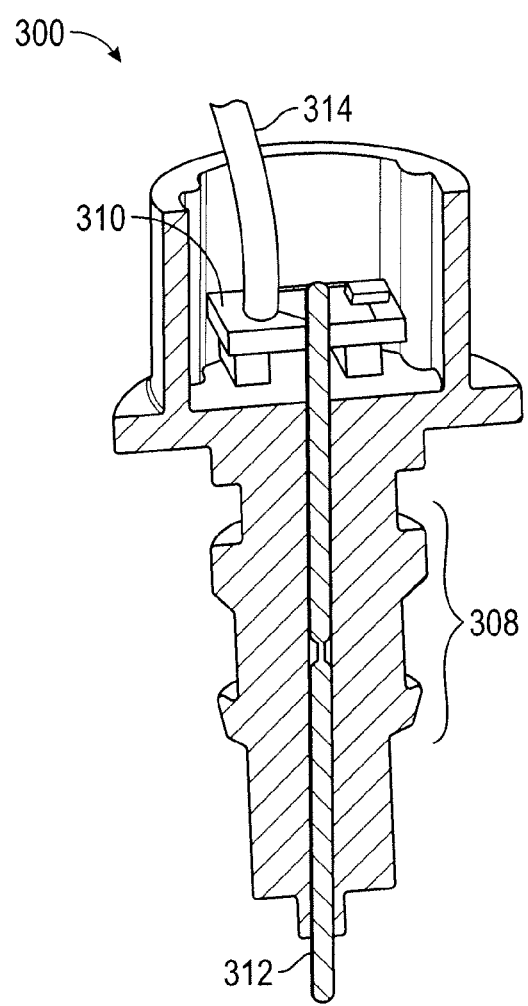

Referring to FIG. 2, a method 200 of reading a digital chip (e.g., digital chip 102) of a digital EIP system and performing a digital recognition of a component of a filter system based on the digital chip is shown according to an exemplary embodiment. A controller or an ECU performs the processes of method 200. The controller or the ECU can have a pre-programmed routine such that when a chip (installed on the filter hardware) is connected, the controller or ECU will perform method 200. The method 200 begins when the controller initializes its memory (202). The controller executes a memory function command stored in the memory (204). The controller requests and receives information from the digital chip (206). To be able to perform the digital recognition function, an electronic connection is necessary between the digital chip of the component of the filter system and the ECU or controller. The information may include parameters about the component of the filter system, including filter part number, serial code, date of manufacture, location of manufacture, and so on. The controller determines if the received information is valid (208). If the information is not valid, the controller repeats processes 204 and 206 until valid information is received. If the information is valid, the controller compares the received information with preprogrammed codes relating to a genuine filter component (210). The preprogrammed information may be stored in a data array. The controller determines if the data matches the preprogrammed information in the data array (212). If the data does not match, the controller marks the component as not genuine (214). If the data matches, the controller marks the component as genuine (216). In a case where it does not detect a genuine filter system, the ECU or controller may decide to set off a fault code, notify the operator through a malfunction indicator lamp (MIL), derate the engine, or perform or provide another suitable response.

Additional details of the above described systems and methods are described in further detail below. The below-described examples relate to example applications of the concept to a Fuel-Water separator, Lube/Fuel filter, and cartridge style filter assemblies.

Example: Integrated Chip in a Water-in-fuel (WIF) Sensor for Fuel-water Separators Referring to FIGS. 3A through 3D, a WIF sensor system 300 is shown according to an exemplary embodiment. The system 300 includes a WIF sensor 302 connected to a wiring harness 304. The WIF sensor 302 includes a digital chip 306 (e.g., a 1-WIRE® chip) integrated in the body of the WIF sensor 302. The digital chip 306 stores information (e.g., information as discussed above with respect to FIGS. 1 and 2). The information may be encrypted. The information is to be pulled by the ECU and verified (e.g., at regular intervals, at every key-on event, etc.). The WIF sensor is part of a fuel-water separator assembly. In this design, the WIF sensor 302 is installed on a filter through a one-directional, snap-in feature 308 that creates a permanent connection between the filter and the WIF sensor 302 (see e.g., U.S. Pat. No. 8,105,483). A Printed Circuit Board (PCB) 310 contains the digital chip 306. The digital chip 306 may be soldered to the PCB 310. The PCB 310 is designed to provide connection holes for two WIF probes 312 and sensor connector wires 314 for links to a control circuit external to the filter, such as the ECU of an internal combustion engine. The probes 312 and sensor connector wires 314 may be soldered and potted with epoxy. Electrical traces built into the PCB facilitate the signal communication between the digital chip 306 and the sensor connector, and later to the ECU. The PCB 310 is enclosed inside the body of the WIF sensor 302. Alternatively, the filter recognition feature could be established by assembling the digital chip 306 to the filter by other means, provided a connection line to the ECU is made available. In some arrangements, the PCB 310 additionally includes a resistor 316, The resistor may be an 82 kOhm resistor and may be welded between the pins to the PCB 310.

During engine operation, the WIF sensor 302 is connected to the ECU with wiring harness 304 such that, when the ECU is powered on, it forms an electrical circuit with the digital chip 306 built into the filter body. The unique code or information that is stored in a memory of the digital chip 306 chip in every filter is used as a way to identify that a genuine filter is installed on the engine. At the same time, another voltage band across the sensor probes is used by the ECU to detect presence of WIF and indicate to the operator that the filter is due to be drained for water.

In the example of system 300, the filter recognition feature is provided using an existing electrical connection with the ECU through the WIF sensor 302 installed in fuel-water separators.

Example: Integrated Resistor in Filter Body (Non-WIF Sensor Based Filter Recognition)

Referring to FIGS. 4A through 4E, a digital chip based filter recognition system 400 is shown according to an exemplary embodiment. The digital chip based filter recognition system 400 can be applied to liquid filtration products (e.g., lube filters, fuel filters, hydraulic filters, etc.) that do not have an existing WIF sensor connection to the ECU (e.g., as discussed above with respect to system 300). In system 400, a recognition module 402 is permanently attached to the filter body 404 via a mounting boss 406. The recognition module 402 may be attached on the top, bottom, side or any part of the filter body 404. The recognition module 402 is attached to the filter body via plastic welding, epoxying, or another suitable connection type.

Figure 4A:
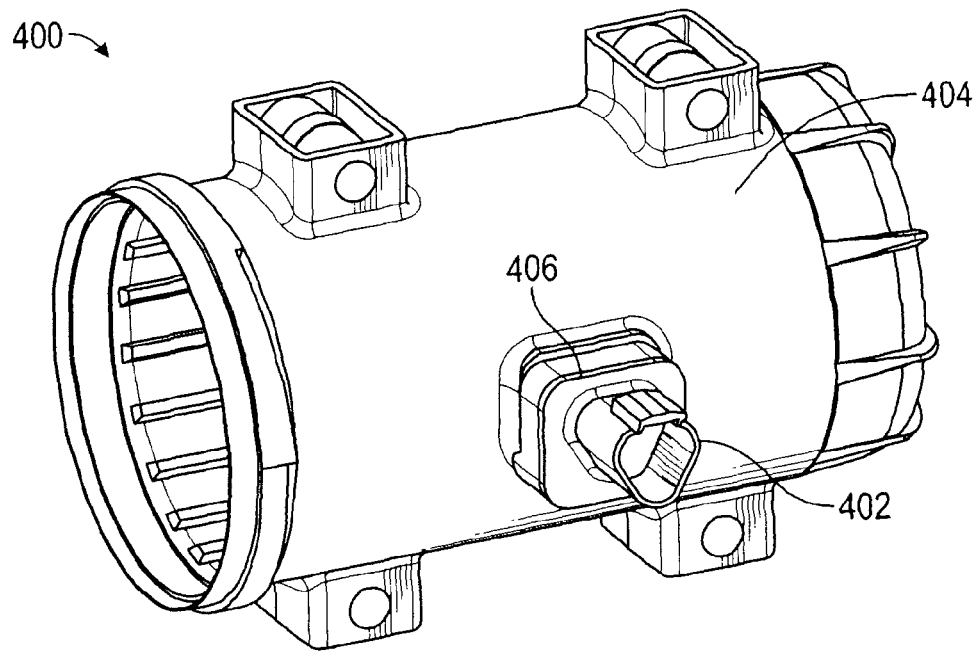
FIGS. 4A through 4E show a digital chip based filter recognition system according to an exemplary embodiment.
Figure 4B:
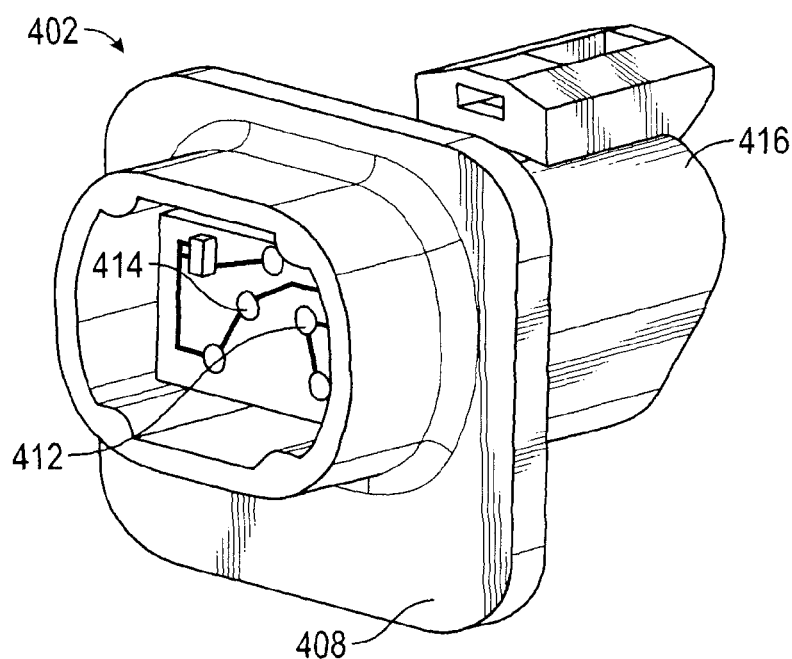
Figure 4C:
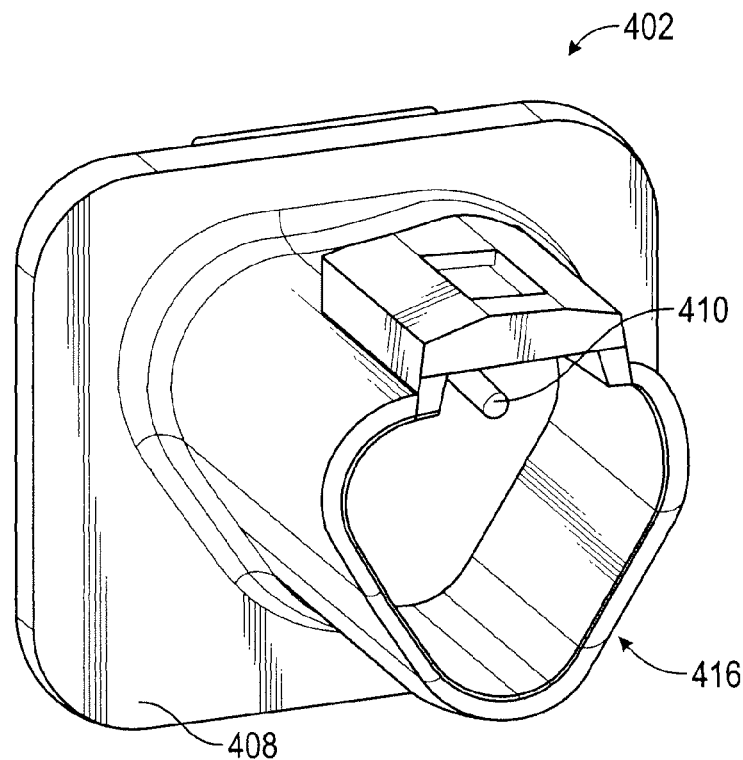
Figure 4D:
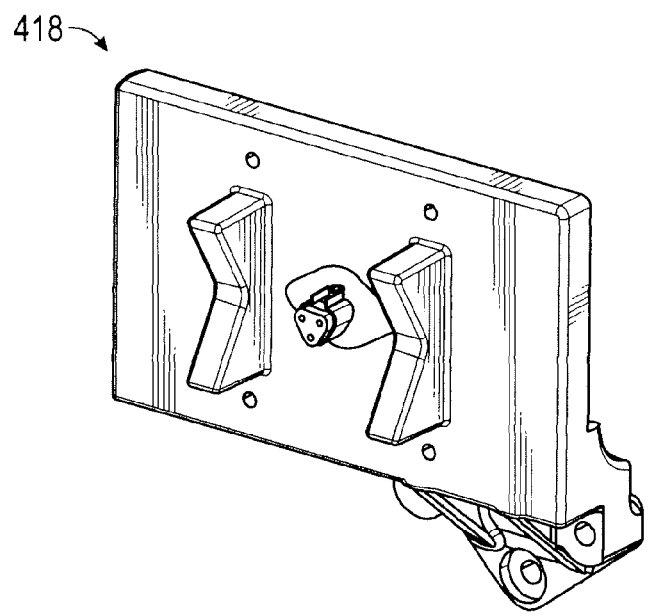
Figure 4E:
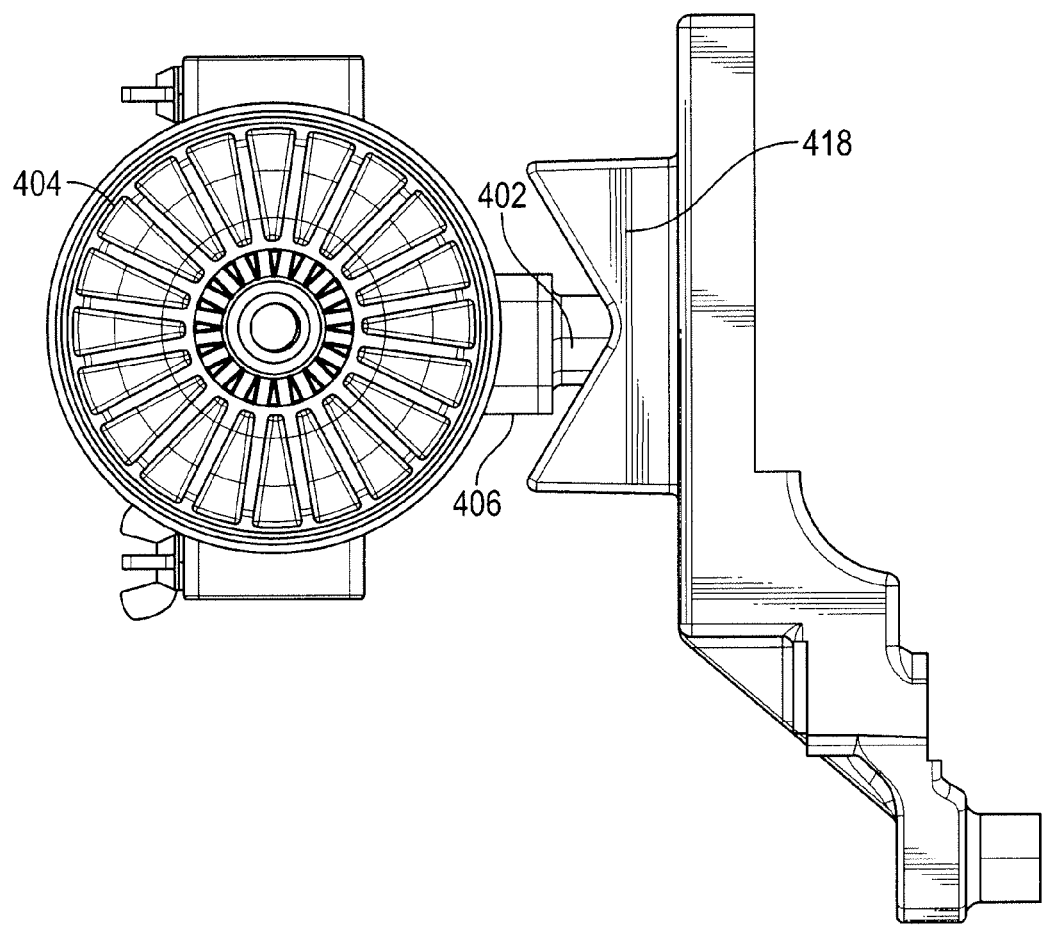

The recognition module 402 may be constructed in many different forms and shapes, one of which in rectangular form, which is shown in FIGS. 4A through 4E. The recognition module 402 consists of an insulative material body 408 (e.g., a plastic body) through which two electrical contact pins 410 are provided to form a male electrical connection to the ECU via a wiring harness. Although male contact pins 410 are shown in FIG. 4C, a pin or crimp electrical contact can be provided on the insulative material body 408 to form a male or female electrical connection respectively depending upon choice. On the other side of the recognition module 402, the pins 410 are directly connected to a PCB 412. The PCB 412 may be a flexible PCB. Any suitable means of attachment can be used to connect the pins 410 to the PCB 412, including soldering (as shown FIG. 4B) and epoxy. One pin provides power and signal communication for the chip and the other pin is grounded.

A pre-programmed digital chip 414 (e.g., a 1-WIRE® chip), is provided on the PCB 412 to form an integrated circuit (IC) assembly. Any method of IC packaging technology (e.g., through-hole, surface mount, etc.) can be used to construct the IC assembly. The digital chip 414 is attached to the PCB 412 via a surface mount packaging method (e.g., soldering, sonic welding, etc.). This recognition module 402 is permanently attached to the filter assembly via the mounting boss 406 on the filter body 404. The other end of the recognition module forms a connector 416 for the ECU connection. The digital chip 414 stores encrypted code containing information about the filter assembly.

When a new filter with the integrated recognition module is installed onto the engine and connected to the ECU via a wiring harness 418. The wiring harness includes a female connector which in turn connects the PCB 412 to the ECU. The ECU provides power to the digital chip 412 and attempts to read the encrypted digital information from the digital chip 412 in the recognition module 402. Afterwards, the ECU can correctly match the gathered digital information to pre-programmed codes, and therefore, detect the presence of a genuine filter.

Example: Resistor Based Electronic Recognition for a Cartridge Filter

Filter assemblies, which have serviceable replacement cartridge filters, can also be provided with a digital chip-based electronic filter recognition feature. The recognition feature can be integrated in the top endplate of the filter element, the bottom endplate of the filter element, or another suitable location of the filter element. The electrical connection from the digital filter recognition feature (situated in the top or bottom endplate) to the ECU can be made through various means. Two different arrangements of the above noted example are discussed in further detail below with respect to FIGS. 5A through 5F and FIGS. 6A through 6E.

Referring to FIGS. 5A through 5F, a filter cartridge 500 is shown according to an exemplary embodiment. As described in further detail below, the filter cartridge 500 includes a digital filter recognition feature attached permanently to the bottom endplate of the filter cartridge, with connection made to ECU through a dual-sided, WIF-like sensor that is integrated directly into the body of the filter shell or filter housing.

The filter cartridge 500 includes a filter element 502 with top endplate (not shown) and bottom endplate 504. An electronic filter recognition module 506 is integrated with the bottom endplate 504. As discussed above, the recognition module 506 can be of any form, shape and size, in this particular instance, the recognition module is shown as being a square shaped module. The recognition module 506 consists of a digital chip 508 (e.g., a 1-WIRE® chip). The digital chip 508 may be an IC. The digital chip 508 attached to or embedded on a PCB 510, and electrical contacts that are housed inside a housing 512. The housing 512 may be square in shape and may be constructed of plastic or any other insulator. The housing 512 may be sonic welded to the bottom endplate 504. This method of construction of the recognition module 506 is similar to the one described above with respect to recognition module 402. The recognition module 506 differs from the recognition module 402 in that pin receptacle electrical contacts 514 are used. A suitable means of attachment can be used to connect the pin receptacles 514 to the PCB 510 (e.g., soldering, epoxy, etc.). The digital chip 508 may be soldered onto the PCB 510 via surface mount packaging method. The recognition module 506 is permanently attached to the bottom end plate 504 using a suitable attachment method (e.g., plastic welding, epoxy, etc.). The recognition module 506 includes a female connector 516 positioned opposite the pin receptacles 514 (i.e., the opposite side of the housing 512 than the side with the PCB 510).

Figure 5A:
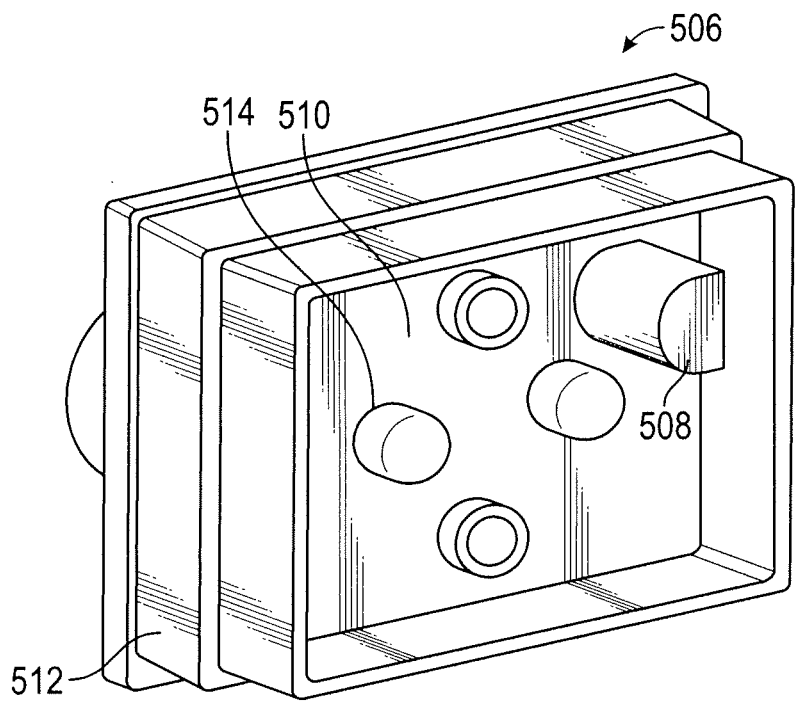
FIGS. 5A through 5F show a filter cartridge according to an exemplary embodiment.
Figure 5B:
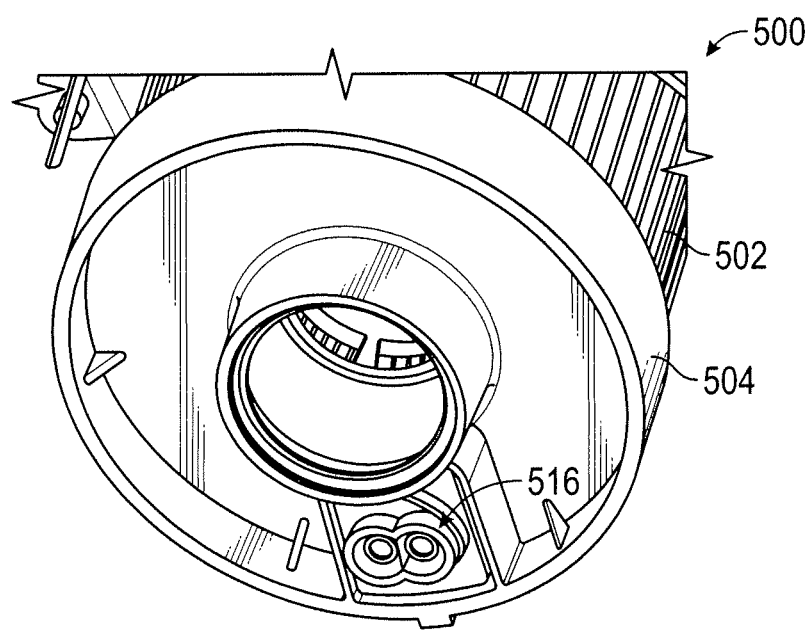
Figure 5C:
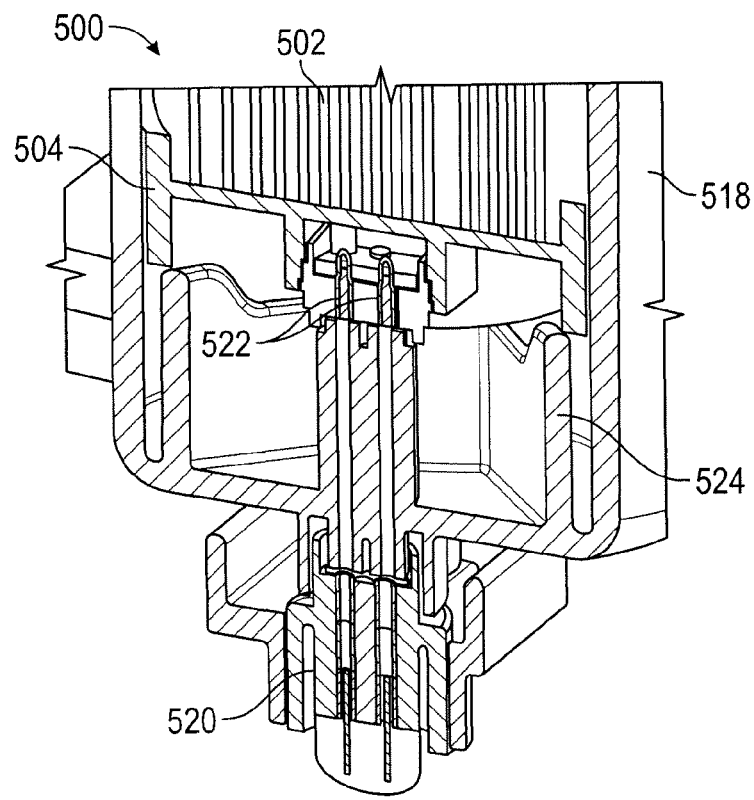
Figure 5D:
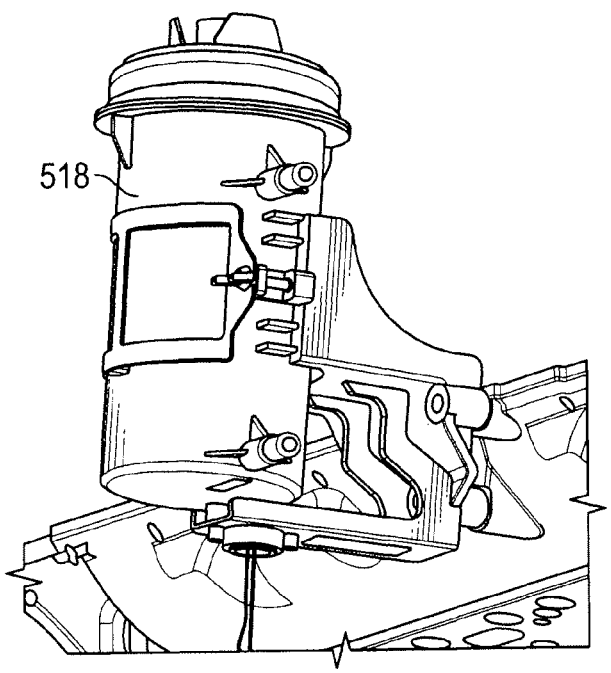
Figure 5E:
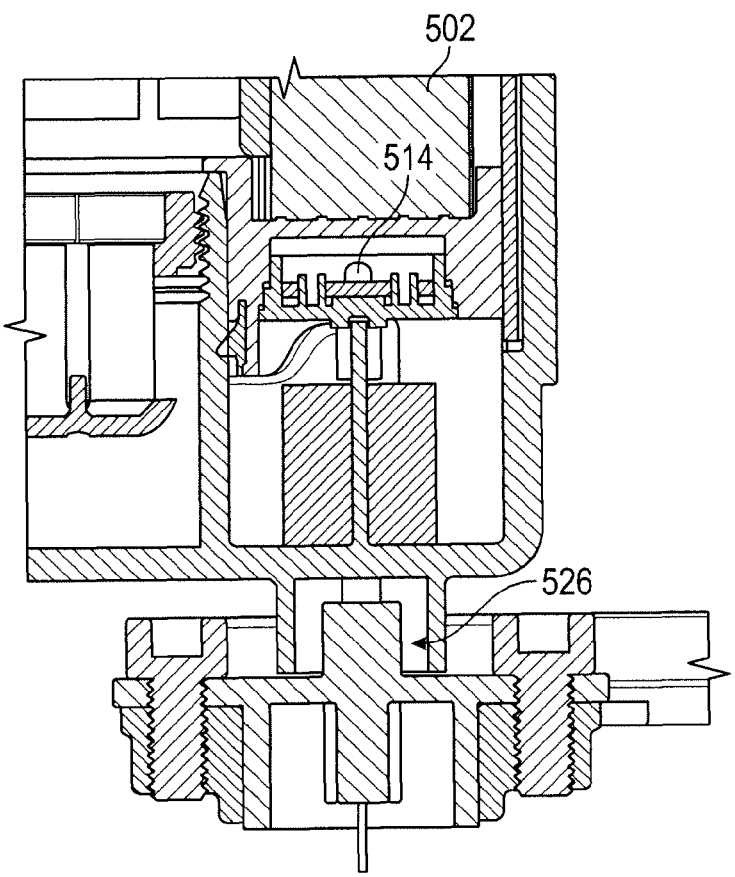
Figure 5F:
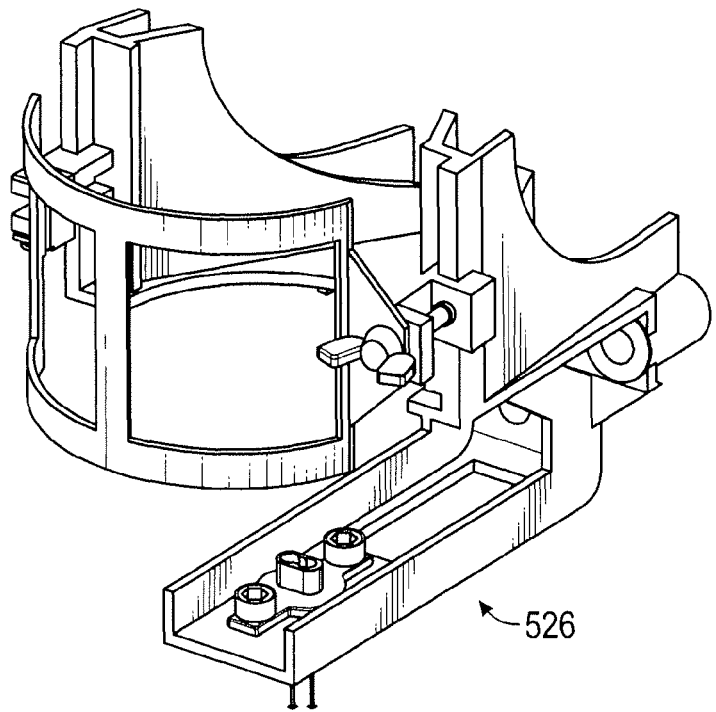

Since the recognition module 506 is an integral part of the bottom endplate 504, the recognition module 506 is part of the filter element 502. As shown in FIGS. 5C through 5E, the filter element 502 is shown assembled in a filter housing assembly 518. When installed in the filter housing assembly 518, the recognition module 506 connects with a sensor 520 with sensing probes 522 that are attached to a bottom shell portion 524 of the filter housing assembly 518. The sensor 520 may be a WIF sensor in cases of fuel-water separators with cartridge elements or a filter recognition sensor in cases of lube, fuel, hydraulic, or other filters having cartridge elements.

Upon installation of the filter element 502 into the housing 518, the female pin receptacles 514 of the recognition module 506 connect to the male sensor probes 522 on one end of the sensor 520, and the other end of the sensor is in-turn are connected to the ECU via a wiring harnesses 526. The wiring harness 526 includes a bracket that has a bolted connector which receives the connection from the cartridge 400 and the housing further communicating digital data to the ECU. The bottom connector is guided in the bracket of the wiring harness 526 to ensure proper alignment of the cartridge 500. Upon providing electrical power, the ECU system, as discussed above, attempts to read the encrypted digital information from the digital chip 508 in the recognition module 506 to correctly detect the presence of a genuine filter.

Figure 6A:
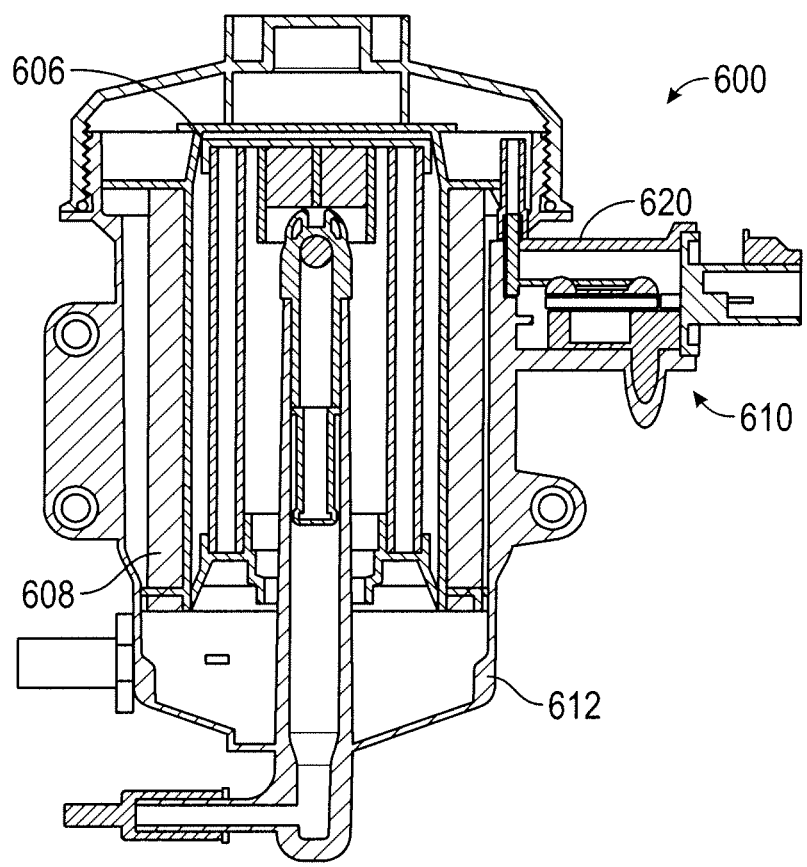
FIGS. 6A through 6E show a filter assembly according to an exemplary embodiment.
Figure 6B:
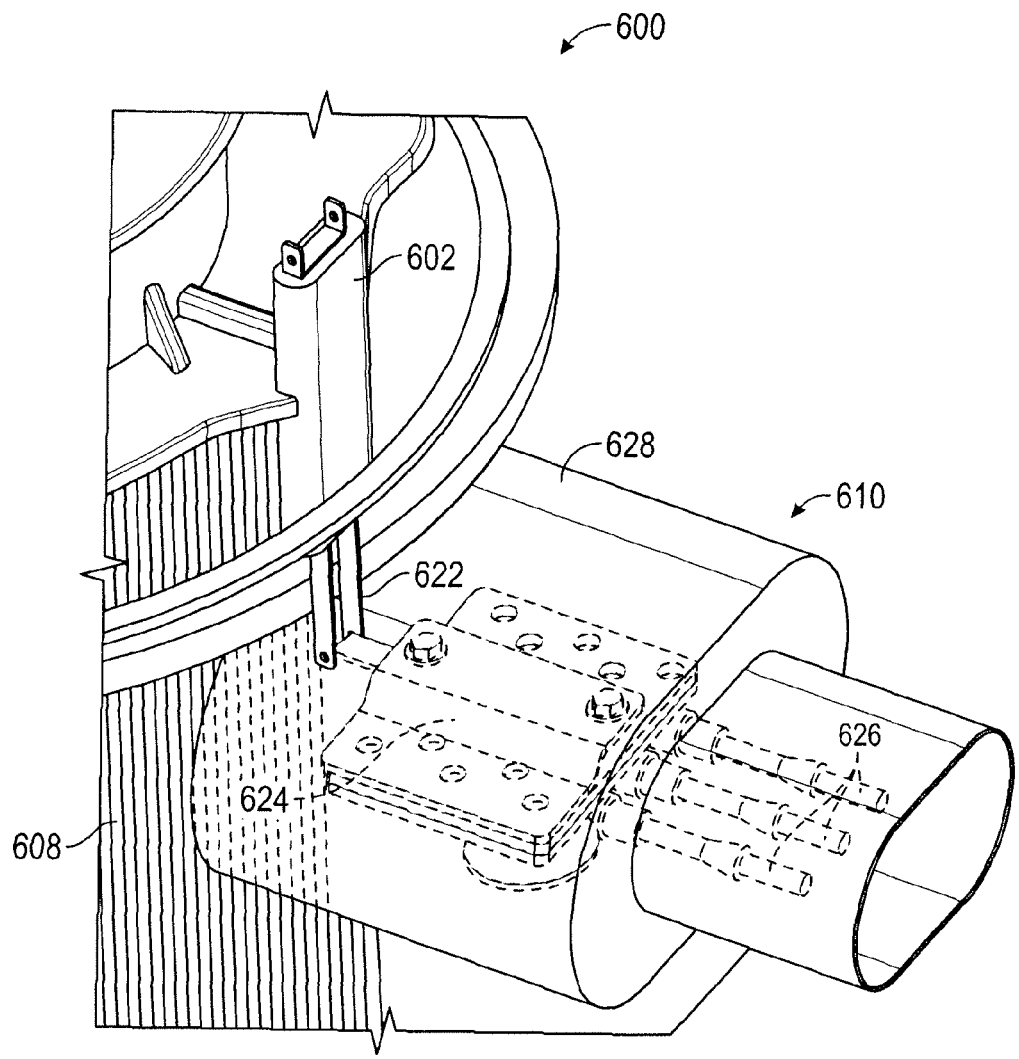
Figure 6C:
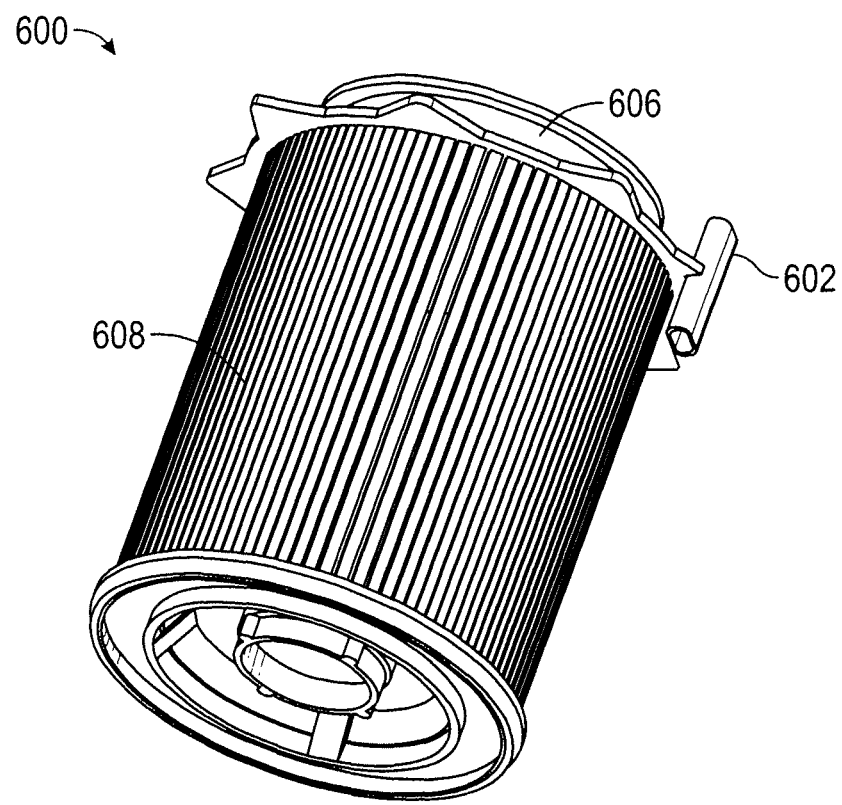
Figure 6D:
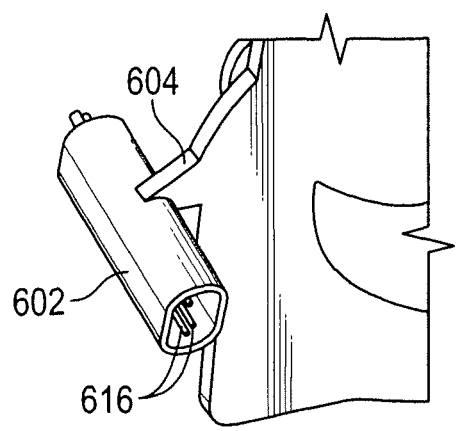

Referring to FIGS. 6A through 6E, a filter assembly 600 is shown according to an exemplary embodiment. As described in further detail below, the filter assembly 600 includes a digital recognition feature built into a top endplate, with the connection made to the ECU through a fuel-heater. The filter assembly 600 includes a digital chip recognition module 602 integrated directly to an extension 604 of the top endplate 606 of a replaceable filter element 608. The recognition module 602 includes a digital chip (e.g., a 1-WIRE® chip) that performs a similar identification function with respect to the filter element 608 as described above with respect to the recognition module 506 and filter element 502. An electrical connection between the recognition module 602 and the ECU 614 is established through any means. As shown in FIGS. 6A and 6B, the electrical connection is made through an existing heater assembly 610 integrated on the shell housing 612 of the filter assembly 600. The recognition module 602, which includes the digital chip attached to a PCB (e.g., in a similar manner as described above with respect to system 300, system 400, and filter cartridge 500), is turn integrated in the top endplate 606 through any means such that two electrical contact pins 616 are electrically connected to the PCB assembly. The electrical contact pins 616 are included in the top end plate plastic body or any other insulative material. The contact pins 616 form a male electric connection on one end while the other end houses the other electronic components, including the digital chip and PCB. The location of the recognition module 602 as shown in this example is on the side of the top endplate 606. In alternative arrangements, the recognition module 602 can be permanently attached to any other side of the endplate (side, top, bottom etc.) as long as an electrical connection through a wiring harnesses 618 is available to be made to the ECU 614.

Figure 6E:
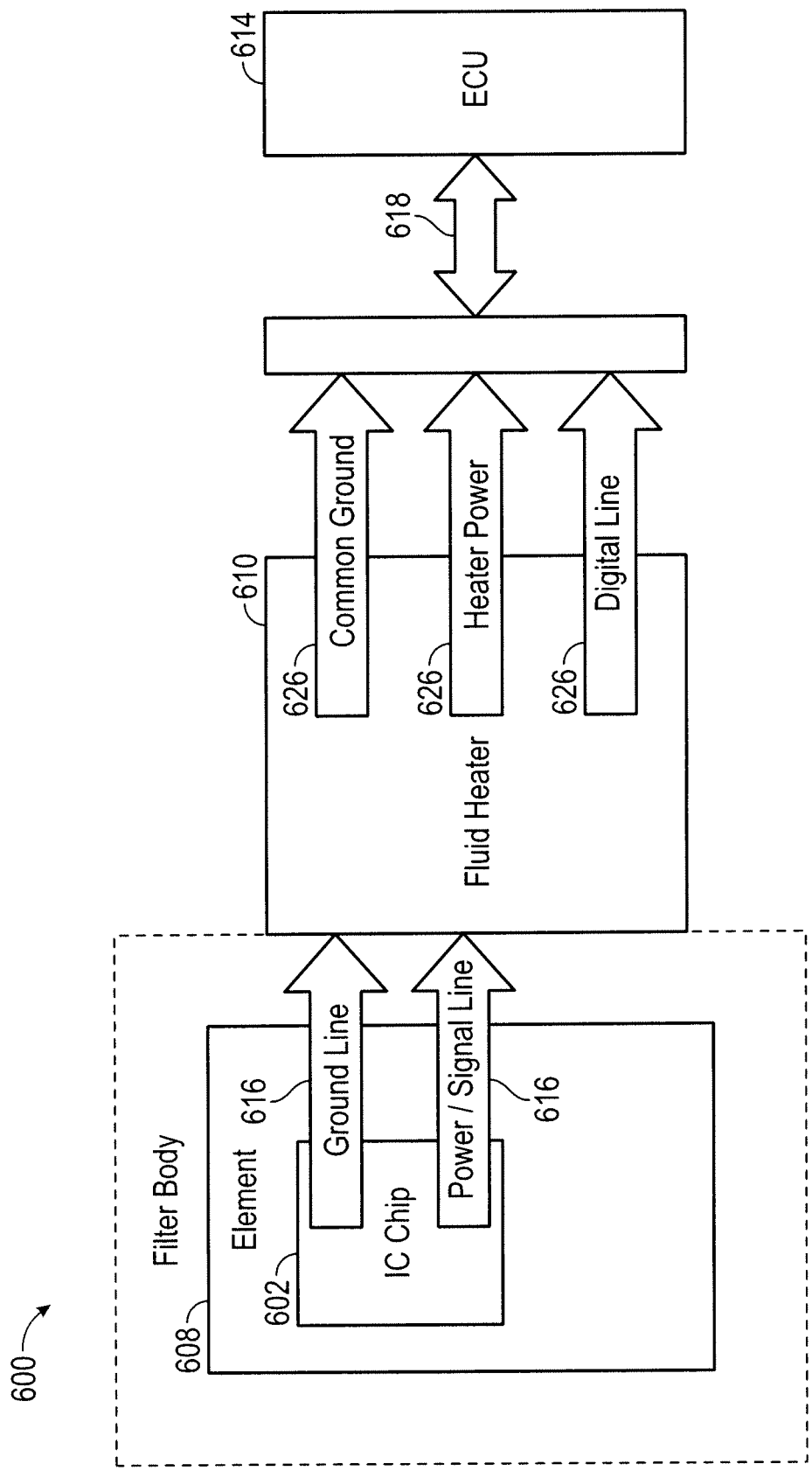
Figure 7:
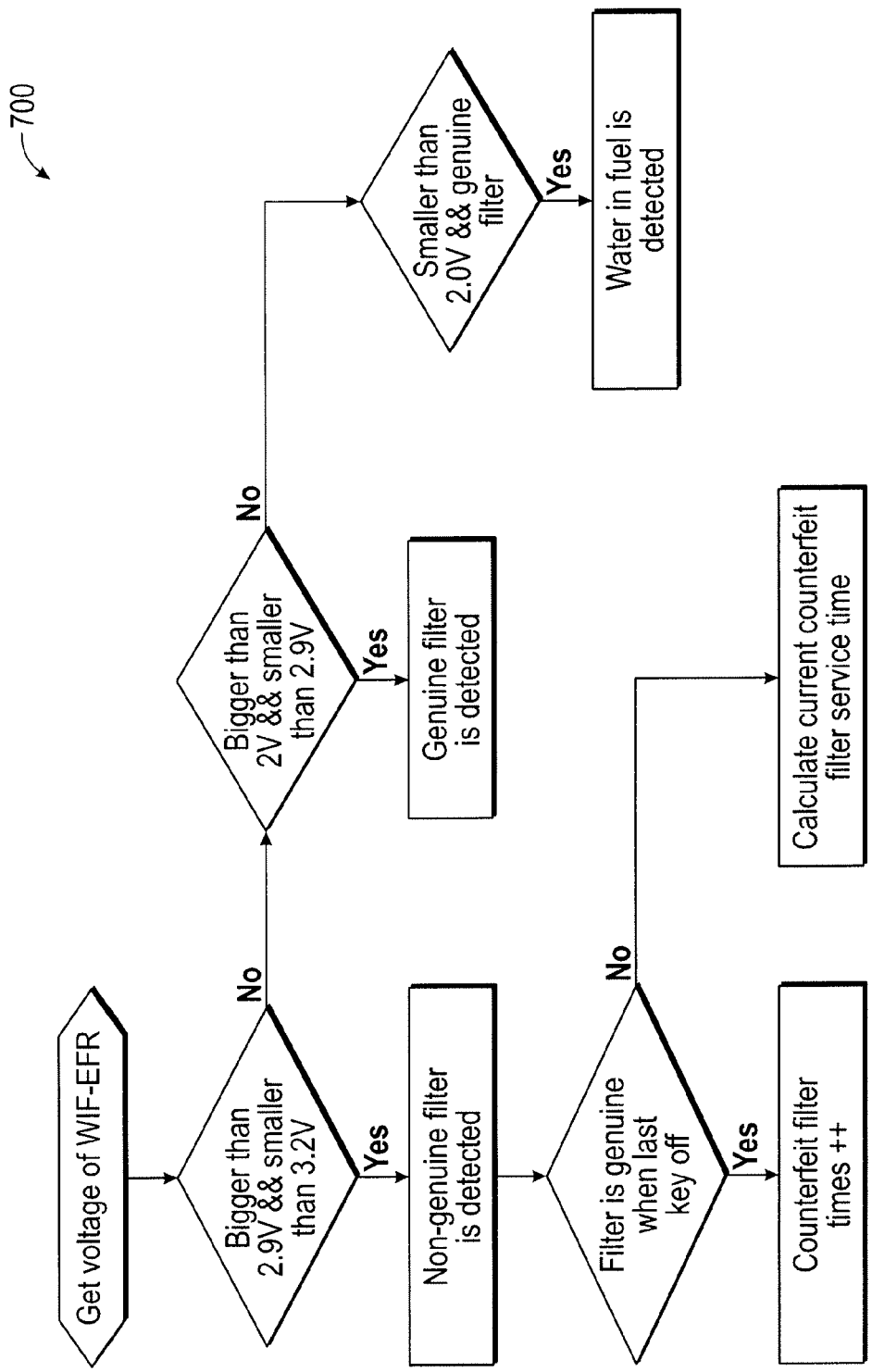
FIG. 7 shows a method of performing analog EIP according to an exemplary embodiment.

On the filter shell housing 612, a protrusion 620 provides for female connector to which the connector pins 616 from the top-endplate 606 can be connected. The protrusion 620 on the shell housing 612 includes two metal crimps 622 integrated in the female sockets of the shell housing 6012, which in-turn are connected to a metal connection plate 624 on the heater assembly 610, which in-turn is electrically connected to male pin(s) 626 of the heater assembly 610. As shown in FIGS. 6B and 6E, the heater assembly 610 includes three connection pins 626: a common ground pin, a heater power pin, and a digital line pin. The digital line pin is used to provide for the added filter electronic recognition feature provided by the recognition module 602. The heater power pin and the ground pin are used for the intended purpose of electrically heating the fluid with the heater assembly 610. Accordingly, a joint heater and filter recognition assembly is shown. This assembly can be connected to the mounting boss 628 of the housing 612.

The recognition module 602 is an integral part of the top endplate 606, and thus, part of the filter element 608. Upon installation of the filter element 608 into the housing body 612, the recognition module 602 forms an electrical connection to the ECU 614 via the male pins 616 on the top endplate 606, then to the female connector crimps 622, the metal plate 624, the heater pins 626 and then through the wiring harness 618. Upon providing electrical power, the ECU 614, similar to as discussed above with respect to system 300, system 400, and filter cartridge 400, attempts to correctly detect the presence of a genuine filter by reading the encrypted digital information from the digital chip in the recognition module 602.

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

What is claimed is:

1. A filter recognition apparatus, comprising:
   a filter element constructed to filter a fluid;
   a control circuit; and
   a pre-programmed digital microchip coupled to the filter element, the digital microchip including a memory that stores an identifying code that identifies the filter element, the digital microchip comprising a single data line and ground reference to establish electronic communication between the digital microchip and the control circuit,
   wherein the filter element is part of a fuel-water separator, the fuel-water separator comprising a water-in-fuel (WIF) sensor, and wherein the digital microchip is embedded in the WIF sensor.

2. The apparatus according to claim 1, wherein the digital microchip comprises an electronic memory component.

3. The apparatus according to claim 1, wherein the identifying code stored in the memory is encrypted.

4. The apparatus according to claim 1, comprising a housing that contains the filter element, wherein the digital microchip is attached to the housing.

5. The apparatus according to claim 4, wherein the digital microchip is contained in a recognition module attached to the filter housing.

6. The apparatus according to claim 5, wherein the recognition module comprises a plastic body through which electrical contact pins are provided for connection to the digital microchip.

7. The apparatus according to claim 6, wherein the digital microchip is contained on a printed circuit board (PCB) that is connected to the electrical contact pins.

8. The apparatus according to claim 5, wherein the recognition module comprises a plastic body though which electrical receptacles are formed.

9. The apparatus according to claim 4, wherein the housing comprises a top end plate and a bottom end plate and wherein the digital microchip is attached to one of the top end plate and bottom end plate.

10. A filter recognition apparatus, comprising:
a filter element constructed to filter a fluid;
a control circuit;
a pre-programmed digital microchip coupled to the filter element, the digital microchip including a memory that stores an identifying code that identifies the filter element, the digital microchip comprising a single data line and ground reference to establish electronic communication between the digital microchip and the control circuit; and
a housing that contains the filter element, wherein the digital microchip is attached to the housing, and wherein the digital microchip is contained in a recognition module attached to the filter housing, the recognition module comprising plastic body though which electrical receptacles are formed, and wherein the electrical receptacles are formed through a printed circuit board (PCB).

11. The apparatus according to claim 10, comprising a sensor on the filter housing, the sensor comprising probes that extend through the receptacles on the PCB.

12. The apparatus according to claim 11, comprising a wiring harness for connecting the sensor to the control circuit.

13. The apparatus according to claim 9, comprising an electrical connector for connecting the digital microchip to the control circuit via a heater assembly for heating fluid in the apparatus.

14. The apparatus according to claim 13, wherein the electrical connector comprises electrical contact pins.

15. The apparatus according to claim 14, wherein the filter comprises a housing protrusion haying at least one female connector to which the electrical contact pins are connected.

16. The apparatus according to claim 15, wherein the heater assembly comprises a metal connection plate to which the at least one female connector is connected.

17. A system providing filter recognition, the system comprising:
a filter element constructed to filter a fluid;
a control circuit;
a water-in-fuel (WIF) sensor having two WIF probes;
a pre-programmed digital microchip coupled to the filter element and containing an encrypted digital identifier that identifies the filter element, the digital microchip comprising a single data line and ground reference to establish electronic communication between the digital microchip and the control circuit, the pre-programmed digital microchip comprising a circuit board including memory, the circuit board defining connection holes through which the two WIF probes extends to establish links to the control circuit; and
the control circuit reads the digital identifier from the digital microchip and compares the digital identifier to a stored identifier to determine whether the filter element is a recognized filter element.

18. The system according to claim 17, comprising a user interface, wherein the control circuit communicates through the user interface to an operator Whether the filter element is a recognized filter element.

19. The system according to claim 18, wherein the user interface comprises a display.

20. A method of filter recognition, the method comprising:
providing a filter element constructed to filter a fluid;
providing a control circuit;
providing a water-in-fuel (WIF) sensor having two WIF probes;
programming a digital microchip with an encrypted digital identifier that identifies the filter element, the digital microchip comprising a single data line and ground reference to establish electronic communication between the digital microchip and a control circuit, the digital microchip comprising a circuit board including memory, the circuit board defining connection holes through which the two WIF probes extend to establish links to the control circuit;
coupling the digital microchip to the filter element;
reading the digital identifier from the digital microchip; and
comparing the digital identifier to a stored identifier to determine whether the filter element is a recognized filter element.

21. The method according to claim 20, comprising communicating by the control circuit to an operator whether the filter element is a recognized filter element.

22. A filter recognition apparatus, comprising:
a filter element constructed to filter a fluid;
a control circuit;
a water-in-fuel (WIF) sensor having two WIF probes; and
a pre-programmed digital microchip coupled to the filter element, the digital microchip comprising a printed circuit board (PCB) including a memory that stores an identifying code that identifies the filter element, the digital microchip comprising a single data line and ground reference to establish electronic communication between the digital microchip and the control circuit, the PCB defining connection holes through which the two WIF probes extend to establish links to the control circuit external to the filter.

23. The apparatus according to claim 22, comprising an electrical connector wire connecting both the PCB and the WIF sensor to the control circuit.

* * * * *